(12) United States Patent
Li et al.

(10) Patent No.: US 10,817,490 B2
(45) Date of Patent: Oct. 27, 2020

(54) PARSER FOR SCHEMA-FREE DATA EXCHANGE FORMAT

(71) Applicant: Microsoft Technology Licensing, LLC, Redmond, WA (US)

(72) Inventors: Yinan Li, Redmond, WA (US); Nikolaos Romanos Katsipoulakis, Pittsburgh, PA (US); Badrish Chandramouli, Redmond, WA (US); Jonathan D Goldstein, Woodinville, WA (US); Donald Kossmann, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 542 days.

(21) Appl. No.: 15/582,313

(22) Filed: Apr. 28, 2017

(65) Prior Publication Data

US 2018/0314722 A1 Nov. 1, 2018

(51) Int. Cl.
| | | |
|---|---|---|
| *G06F 17/00* | (2019.01) | |
| *G06F 16/22* | (2019.01) | |
| *G06F 16/25* | (2019.01) | |
| *G06F 16/23* | (2019.01) | |
| *G06F 16/2455* | (2019.01) | |
| *G06F 16/81* | (2019.01) | |
| *G06F 40/221* | (2020.01) | |

(52) U.S. Cl.
CPC ...... *G06F 16/2237* (2019.01); *G06F 16/2365* (2019.01); *G06F 16/2455* (2019.01); *G06F 16/258* (2019.01); *G06F 16/81* (2019.01); *G06F 40/221* (2020.01)

(58) Field of Classification Search
CPC .. G06F 16/2237; G06F 16/81; G06F 16/2455; G06F 16/258; G06F 16/2365
See application file for complete search history.

(56) References Cited

U.S. PATENT DOCUMENTS

| | | | |
|---|---|---|---|
| 8,260,784 B2 | 9/2012 | Beyer et al. | |
| 9,092,502 B1 | 7/2015 | Cannaliato et al. | |
| 9,424,003 B1 | 8/2016 | Neumann | |
| 9,953,058 B1* | 4/2018 | Sadri | G06F 16/24561 |
| 2007/0073533 A1 | 3/2007 | Thione et al. | |
| 2008/0114725 A1* | 5/2008 | Indeck | G06F 16/22 |

(Continued)

OTHER PUBLICATIONS

Google.com. Google Patents / Non-patent literature. 2020. (Year: 2020).*

(Continued)

*Primary Examiner* — Syed H Hasan
(74) *Attorney, Agent, or Firm* — Schwegman Lundberg & Woessner, P.A.

(57) ABSTRACT

A method includes obtaining a query containing at least one field from which data is being queried, obtaining a dataset having a schema-free data exchange format having multiple fields of data at different physical positions in the dataset, and parsing the dataset by obtaining a structural index that maps logical locations of fields to physical locations of the fields of the dataset, accessing the structural index with logical locations of the fields that index to the physical locations, and providing data from the fields based on the physical locations responsive to the query.

20 Claims, 11 Drawing Sheets

(56) References Cited

U.S. PATENT DOCUMENTS

| | | | |
|---|---|---|---|
| 2013/0246646 A1* | 9/2013 | Iliev | H04L 67/02 709/232 |
| 2014/0082002 A1* | 3/2014 | Kim | G06F 16/434 707/755 |
| 2014/0244692 A1 | 8/2014 | Williamson | |
| 2014/0279838 A1 | 9/2014 | Tsirogiannis et al. | |
| 2015/0134670 A1* | 5/2015 | Liu | G06F 16/20 707/741 |
| 2016/0125070 A1* | 5/2016 | Snell | G06F 16/289 707/722 |
| 2016/0314104 A1* | 10/2016 | Phillips | G06F 16/316 |
| 2016/0378792 A1 | 12/2016 | Rashid et al. | |

OTHER PUBLICATIONS

International Search Report and Written Opinion Issued in Patent Application No. PCT/US2018/028218, dated Jul. 4, 2018, 13 Pages.

Karpathiotakis, et al., "Fast Queries Over Heterogeneous Data Through Engine Customization", In Proceedings of the VLDB Endowment, vol. 9, Issue 12, Aug. 2016, pp. 972-983.

Shukla, et al., "Schema-Agnostic Indexing with Azure DocumentDB", In Proceedings of the 41st International Conference on Very Large Data, Aug. 2015, pp. 1668-1679.

"Apache Avro", "https://avro.apache.org/", May 22, 2016, 1 page.

"Apache Drill", "https://drill.apache.org/", Retrieved on: Apr. 6, 2017, 6 pages.

"Apache Parquet", "https://parquel.apache.org/", Retrieved on: Apr. 6, 2017, 2 pages.

Wharton, et al., "Google Gson", "https://github.com/google/gson", Retrieved on: Apr. 6, 2017, 4 pages.

Heaton, et al., "Jackson", "https://github.com/FasterXML/jackson", Retrieved on: Apr. 6, 2017, 11 pages.

"RapidJSON", "http://rapidjson.org/", Retrieved on: Apr. 6, 2017, 11 pages.

"The JSON Data Interchange Format", "https://www.ecma-internationa.org/publications/standards/Ecma-404.htm", Oct. 2013, 14 pages.

Abouzied, et al., "Invisible loading: access-driven data transfer from raw files into database systems", In Proceedings of the 16th International Conference on Extending Database Technology, Mar. 18, 2013, 10 pages.

Aho, et al., "Compilers: Principles, Techniques, and Tools (2nd Edition)", In Publication of Addison Wesley Longman, Sep. 10, 2006, 1038 pages.

Alagiannis, et al., "NoDB: efficient query execution on raw data files", In Proceedings of the ACM SIGMOD International Conference on Management of Data, May 20, 2012, 12 pages.

Armbrust, et al., "Spark SQL: relational data processing in spark", In Proceedings of the 2015 ACM SIGMOD International Conference on Management of Data, May 31, 2015, 12 pages.

Bailis, et al., "Prioritizing attention in analytic monitoring", In Proceedings of 8th Biennial Conference on Innovative Data Systems Research, Jan. 8, 2017, 6 pages.

Beyer, et al., "Jaql: A scripting language for large scale semistructured data analysis", In Proceedings of 37th International Conference on Very Large Data Bases, vol. 4, Issue 12, Aug. 29, 2011, pp. 1272-1283.

Bray, E. T., "The JavaScript Object Notation (JSON) Data Interchange Format", https://tools.ietf.org/html/rfc7159.html, Mar. 2014, 16 pages.

Cameron, et al., "Parallel scanning with bitstream addition: An XML case study", In Proceedings of European Conference on Parallel Processing, Aug. 29, 2011, pp. 1-16.

Chandramouli, et al., "Trill: A high-performance incremental query processor for diverse analytics", In Proceedings of 41st International Conference on Very Large Data Bases, vol. 8, Issue 4, Dec. 2014, pp. 401-412..

Chasseur, et al., "Enabling JSON document stores in relational systems", In Proceedings of the 16th International Workshop on the Web and Databases, Jun. 1, 2013, pp. 1-16.

Cheng, et al., "Parallel in-situ data processing with speculative loading", In Proceedings of the ACM SIGMOD International Conference on Management of Data, Jun. 22, 2014, pp. 1287-1298.

Discala, et al., "Automatic generation of normalized relational schemas from nested key-value data", In Proceedings of the International Conference on Management of Data, Jun. 26, 2016, 16 pages.

Gousios, Georgios, "The GHTorrent dataset and tool suite", In Proceedings of the 10th Working Conference on Mining Software Repositories, May 18, 2013, 5 pages.

Idreos et al. "Here are my Data Files. Here are my Queries. Where are my Results?", In Proceedings of 5th Biennial Conference on Innovative Data Systems, Jan. 9, 2011, 12 pages.

Johnson, et al., "Row-wise parallel predicate evaluation", In Proceedings of the VLDB Endowment, vol. 1, Issue 1, Aug. 23, 2008, pp. 622-634.

Knuth, Donald E., "The Art of Computer Programming", In Publication of Addison-Wesley Professional, Mar. 27, 2009, 664 pages.

Li, et al., "BitWeaving: fast scans for main memory data processing", In Proceedings of the ACM SIGMOD International Conference on Management of Data, Jun. 22, 2013, pp. 1-15.

Liu, et al., "Json data management: supporting schema-less development in RDBMS", In Proceedings of the ACM SIGMOD International Conference on Management of Data, Jun. 22, 2014, pp. 1247-1258.

Liu, et al., "Closing the functional and performance gap between SQL and NoSQL", In Proceedings of the International Conference on Management of Data, Jun. 26, 2016, pp. 227-238.

Melnik, et al., "Dremel: Interactive analysis of web-scale datasets", In Proceedings of the VLDB Endowment, vol. 3, Issue 1-2, Sep. 2010, 10 pages.

Muhlbauer, et al., "Instant loading for main memory databases", In Proceedings of the VLDB Endowment, vol. 6, Issue 14, Sep. 2013, pp. 1702-1713.

Nicola, et al., "XML parsing: a threat to database performance", In Proceedings of the twelfth international conference on Information and knowledge management, Nov. 3, 2003, 4 pages.

Tahara, et al., "Sinew: a SQL system for multi-structured data", In Proceedings of the ACM SIGMOD International Conference on Management of Data, Jun. 22, 2014, pp. 815-826.

Takase, et al., "An adaptive, fast, and safe XML parser based on byte sequences memorization", In Proceedings of the 14th international conference on World Wide Web, May 10, 2005, pp. 692-701.

Toshniwal, et al., "Storm@twitter", In Proceedings of the ACM SIGMOD international conference on Management of data, Jun. 22, 2014, pp. 147-156..

Zaharia, et al., "Resilient distributed datasets: A fault-tolerant abstraction for in-memory cluster computing", In Proceedings of the 9th USENIX conference on Networked Systems Design and Implementation, Apr. 25, 2012, 14 pages.

* cited by examiner

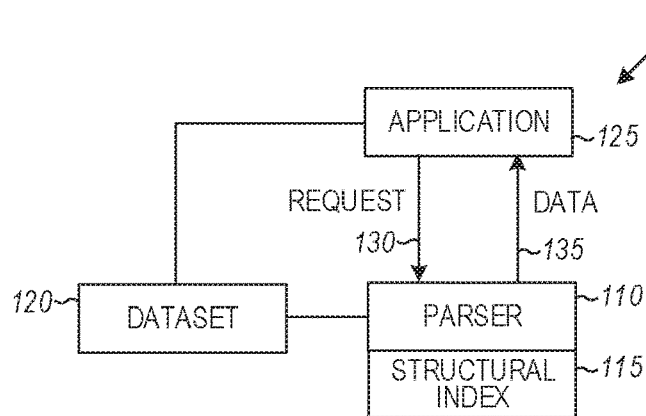

FIG. 1

210 ~ {"id":"id:\"a\"", "reviews":50, "attributes":{"breakfast":false, "lunch":true, "dinner":true, "latenight":true}, "categories":["Restaurant", "Bars"], "state":"WA", "city":"seattle"}

215 ~ {"id":"id:\"b\"", "reviews":80, "attributes":{"breakfast":false, "lunch":true, "latenight":false, "dinner":true}, "categories":["Restaurant"], "state":"CA", "city":"san francisco"}

220 ~ {"id":"id:\"c\"", "reviews":120, "attributes":{"delivery":true, "lunch":true, "dessert": true, "dinner":true}, "categories":["Restaurant"], "state":"NY", "city":"new york"}

225 ~ {"id":"id:\"d\"", "name":"Alice", "age":40, "favorites":30}

230 ~ {"id":"id:\"e\"", "reviews":70, "attributes":{"breakfast":true, "lunch":true, "dinner":true, "latenight":false}, "categories":["Restaurant", "Brunch"], "state":"CA", "city":"los angels"}

235 ~ {"id":"id:\"f\"", "reviews":20, "attributes":{"breakfast":true, "lunch":true, "latenight":true, "dinner":true}, "categories":["Restaurant", "Brunch", "Bars"], "state":"IL", "city":"chicago"}

FIG. 2

(A) TRAINING PHASE

|       |               |                                                                      |
|-------|---------------|----------------------------------------------------------------------|
| Word0 | Original text | {"id":"id:\"a\"","reviews":50,"a                                     |
|       | Mirrored text | a",05:"sweiver","\"a\"/:bi":"bi"}                                    |
|       | Level 1       | 000001000000000000000000100000                                       |
|       | Level 2       | 000000000000000000000000000000                                       |
| Word1 | Original text | ttributes":{"breakfast":false,"l                                     |
|       | Mirrored text | l",eslaf:"tsafkaerb"}:"setubirtt                                     |
|       | Level 1       | 000000000000000000010000000000                                       |
|       | Level 2       | 000000010000000000000000000000                                       |
| Word2 | Original text | unch":true,"dinner":true,"lateni                                     |
|       | Mirrored text | inetal",eurt:"rennid",eurt:"hcnu                                     |
|       | Level 1       | 000000000000000000000000000000                                       |
|       | Level 2       | 000000000001000000000000100000                                       |
| Word3 | Original text | ght":true},"categories":["Restau                                     |
|       | Mirrored text | uatseR"]:"seirogetac",{eurt:"thg                                     |
|       | Level 1       | 000000000000000111111110011100                                       |
|       | Level 2       | 010000100000010000000000000000                                       |
| Word4 | Original text | rant","Bars"],"state":"WA","city                                     |
|       | Mirrored text | ytic","AW":"etats",["sraB","tnar                                     |
|       | Level 1       | 000000000100000000000000000000                                       |
|       | Level 2       | 000000000000000000000000000000                                       |
| Word5 | Original text | ":"seattle"}                                                         |
|       | Mirrored text | {"elttaes":"                                                         |
|       | Level 1       | 000000000000000000000000000010                                       |
|       | Level 2       | 000000000000000000000000000000                                       |

FIG. 5

```
Original text    {"id":"id:\"a\"","reviews":50,"a
Mirrored text    s",02:"sweiver",""/a"/:bi":"bi"}
─────────────────────────────────────────────────────────
                        Step 1:~610
 '\' bitmap:     00000000000000000100100000000000
 '"' bitmap:     01000010000001011001000010100100
 ':' bitmap:     00001000000000000000001000100000
 '{' bitmap:     00000000000000000000000000000001
 '}' bitmap:     00000000000000000000000000000000
─────────────────────────────────────────────────────────
                        Step 2:~620
 structural '"': 01000010000001010000000001010010
─────────────────────────────────────────────────────────
                        Step 3:~630
 string mask:    10000011111110011111110011100
─────────────────────────────────────────────────────────
                        Step 4:~640
 structural ':': 00000100000000000000000000100000
 L1 ':' mask:    00000100000000000000000000100000
 L2 ':' mask:    00000000000000000000000000000000
```

FIG. 6

ALGORITHM 1 BUILDINGSTRINGMASK($b_{quote}$)

INPUT: $b_{quote}$ : THE QUOTE BITMAP
OUTPUT: $b_{string}$ : THE STRING MASK BITMAP 1: $n := 0$
2: for $i := 0$ to $b_{quote}.|word| - 1$ do    ▷ THE NUMBER OF QUOTES IN $b_{quote}$
3:    $m_{quote} := b_{quote}.word_i$
4:    $m_{string} := 0$    ▷ THE STRING MASK
5:    while $m_{quote} \neq 0$ do
6:       $m := \mathbf{S}(m_{quote})$    ▷ EXTRACT AND SMEAR THE RIGHTMOST 1
7:       $m_{string} := m_{string} \oplus m$    ▷ EXTEND $m_{string}$ TO THE RIGHTMOST 1
8:       $m_{quote} := \mathbf{R}(m_{quote})$    ▷ REMOVE THE RIGHTMOST 1
9:       $n := n + 1$
10:    if $n \mod 2 = 1$ then
11:       $m_{string} := \overline{m_{string}}$    ▷ FLIP $m_{string}$ IF NECESSARY
12:    $b_{string}.word_i := m_{string}$
13: return $b_{string}$

FIG. 7A

| | Original text | {"id":"id:\"a\"","reviews":50,"a |
|---|---|---|
| | Mirrored text | s",02:"sweiver","""/a"/:bi":"bi"} |
| Iter1Init | m_quote | 0100001000000010100000001010010 |
| | m_string | 0000000000000000000000000000000 |
| Iter2Init | m = S(m_quote) | 0000000000000000000000000000011 |
| | m_string = m_string ∥ m | 0000000000000000000000000000011 |
| | m_quote = R(m_quote) | 0100001000000010100000001010000 |
| Iter3Init | m = S(m_quote) | 0000000000000000000000000011111 |
| | m_string = m_string ∥ m | 0000000000000000000000000011100 |
| | m_quote = R(m_quote) | 0100001000000010100000001000000 |
| Iter4Init | m = S(m_quote) | 0000000000000000000000001111111 |
| | m_string = m_string ∥ m | 0000000000000000000000001100011 |
| | m_quote = R(m_quote) | 0100001000000010100000000000000 |
| Iter5Init | m = S(m_quote) | 0000000000000000111111111111111 |
| | m_string = m_string ∥ m | 0000000000000000111111110011100 |
| | m_quote = R(m_quote) | 0100001000000010000000000000000 |

*FIG. 7B*

ALGORITHM 2 BUILDLEVELEDCOLONBITMAP($b_{colon}$, $b_{left}$, $b_{right}$, $l$)

INPUT: $b_{colon}$, $b_{left}$, $b_{right}$ : THE STRUCTURAL COLON, STRUCTURAL LEFT BRACE, AND STRUCTURAL RIGHT BRACE BITMAPS
  $l$: THE NUMBER OF NESTING LEVELS
OUTPUT: $b_{0...l-1}$ : THE LEVELED COLON BITMAPS 1: $b_0 := b_{colon}$
2: for $i := 0$ to $b_{right}.|word| - 1$ do
3:   $m_{left} := b_{left}.word_i$
4:   $m_{right} := b_{right}.word_i$
5:   while $m_{right} \neq 0$ do     ▷ ITERATE OVER EACH RIGHT BRACE
6:     $m_{leftbit} := E(m_{left})$     ▷ EXTRACT THE RIGHTMOST 1
7:     $m_{rightbit} := E(m_{right})$     ▷ EXTRACT THE RIGHTMOST 1
8:     while $m_{leftbit} \neq 0$ and $m_{leftbit} < m_{rightbit}$ do
9:       $S.Push(\{i, m_{leftbit}\})$     ▷ PUSH LEFT BIT TO STACK
10:      $m_{left} := R(m_{left})$     ▷ REMOVE THE RIGHTMOST 1
11:      $m_{leftbit} := E(m_{left})$     ▷ EXTRACT THE RIGHTMOST 1
12:    $\{j, m_{leftbit}\} := S.Pop()$     ▷ FIND THE MATCHING LEFT BRACE
13:    if $0 < |S| \leq l$ then     ▷ CLEAR BITS AT THE UPPER LEVEL
14:      if $i = j$ then     ▷ NESTED OBJECT IS INSIDE A WORD
15:        $b_{|S|-1}.word_j := b_{|S|-1}.word_j \wedge \overline{m_{rightbit} - m_{leftbit}}$
16:      else     ▷ NESTED OBJECT IS ACROSS MULTIPLE WORDS
17:        $b_{|S|-1}.word_j := b_{|S|-1}.word_j \wedge (m_{leftbit} - 1)$
18:        $b_{|S|-1}.word_i := b_{|S|-1}.word_i \wedge \overline{(m_{rightbit} - 1)}$
19:        for $k := j + 1$ to $i - 1$ do
20:          $b_{|S|}.word_k := 0$
21:    if $0 < |S| \leq l$ then     ▷ COPY BITS TO THE CURRENT LEVEL
22:      for $k := j$ to $i$ do
23:        $b_{|S|}.word_k := b_{colon}.word_k$
24:    $m_{right} := R(m_{right})$     ▷ REMOVE THE RIGHTMOST 1
25: return $b_{0...l-1}$

FIG. 8

---
ALGORITHM 3 GENERATECOLONPOSITIONS(*index, start, end, level*)
---

INPUT: *index*: THE STRUCTURAL INDEX
  *start, end* : THE START AND END POSITIONS OF THE TARGETED
  OBJECT *level*: THE LEVEL OF THE TARGETED OBJECT
OUTPUT: *c*: AN LIST OF POSITIONS OF COLONS.
1: for $i := \lfloor \frac{start}{w} \rfloor$ to $\lfloor \frac{end}{w} \rfloor$ do
2:    $m_{colon} := index.b_{level}.word_i$
3:    while $m_{colon} \neq 0$ do            ▷ITERATE OVER EACH 1 IN $m_{colon}$
4:       $m_{bit} := \mathbf{E}(m_{colon})$                 ▷EXTRACT THE RIGHTMOST 1
5:       $offset := i \cdot w + popcnt(m_{bit} - 1)$         ▷OFFSET OF THE 1
6:       if $start \leq offset \leq end$ then
7:          c.Append(offset)
8:       $m_{colon} := \mathbf{R}(m_{colon})$                ▷REMOVE THE RIGHTMOST 1
9:    return c
---

FIG. 9

ALGORITHM 4 PARSEOBJECT(tree): PARSING WITH A PATTERN TREE

INPUT: *tree*: THE PATTERN TREE OF AN OBJECT
OUTPUT: true if success, false if failed.
1: *node* := *tree.root*
2: repeat
3:   if *node* is a leaf node then
4:     return true
5:   for each child node *child* of *node* do
6:     if *child*.field is an object field then
7:       *success* := ParseObject(*child*.field.tree)
8:     else if *child*.field is an atomic field then
9:       *success* := Verify(*child*.field, *child*.field_index)
10:    if *success* then
11:      *node* := *child*
12       break
13: until *success* = false
14. return false

FIG. 12

PARSER FOR SCHEMA-FREE DATA EXCHANGE FORMAT

BACKGROUND

JSON (Java Script Object Notation) is a highly popular data format. It is used in most Web applications (e.g., Twitter and Facebook) and is quickly gaining acceptance as a schema-free data exchange format for enterprise applications. JSON is simple, flexible, and has high expressive power. For instance, JSON is commonly used to represent data bags (global variables that are stored as JSON data) and nested objects. The rising popularity of JSON has fueled increased interest in running analytical queries on JSON data. To meet this growing need, many data analytics engines (e.g., Apache Spark, Drill, Storm, and Jaql) natively support the JSON data.

JSON is a raw data format. That is, JSON data is parsed before it can be further processed or analyzed. Unfortunately, parsing JSON data is expensive. As a result, with the current state of the art, JSON data is parsed and loaded into a data processing engine in binary format before it can be analyzed effectively. The total cost of running analytical queries on raw JSON data is often dominated by parsing the raw JSON data.

SUMMARY

A method includes obtaining a query containing at least one field from which data is being queried, obtaining a dataset having a schema-free data exchange format having multiple fields of data at different physical positions in the dataset, and parsing the dataset by obtaining a structural index that maps logical locations of fields to physical locations of the fields of the dataset, accessing the structural index with logical locations of the fields that index to the physical locations, and providing data from the fields based on the physical locations responsive to the query. A method of generating a structural index identifying locations of fields in a dataset having a schema-free data exchange format having multiple fields of data at different physical positions in the dataset includes detecting key/value structural character separators of data fields in the dataset, detecting object begin and object end characters in the dataset, detecting when the structural characters occur within dataset strings and do not define a structure of the dataset, and creating a bitmap corresponding to structural character separators of the data fields that define the structure of the dataset, wherein the bitmap identifies physical locations of such data fields from logical locations of such data fields.

A machine readable storage device has instructions for execution by a processor of a machine to cause the processor to perform operations to perform a method of generating a structural index identifying locations of fields in a dataset having a schema-free data exchange format having multiple fields of data at different physical positions in the dataset, the method including detecting key/value structural character separators of data fields in the dataset, detecting object begin and object end structural characters in the dataset, detecting when the structure characters occur within dataset strings and do not define a structure of the dataset, and creating a bitmap corresponding to structural character separators of the data fields that define structure of the dataset, wherein the bitmap identifies physical locations of such data fields from logical locations of such data fields.

BRIEF DESCRIPTION OF THE DRAWINGS

FIG. 1 is a block diagram illustrating a system utilizing a parser and structural index to efficiently obtain data from fields in a schema-free data exchange format dataset according to an example embodiment.

FIG. 2 is an illustration of an example dataset consisting of six JSON records, according to an example embodiment.

FIG. 5 illustrates leveled colon bitmaps built for the first record of the example dataset of FIG. 2 according to an example embodiment.

FIG. 6 illustrates structural bitmaps being built for word 0 of FIG. 5 over several steps, resulting in a multilevel structured colon bitmap according to an example embodiment.

FIG. 7A is a pseudocode representation of a first algorithm for building a string mask, ($b_{quote}$) according to an example embodiment.

FIG. 7B is set of string bitmaps for multiple iterations over the quote bitmap by the first algorithm according to an example embodiment.

FIG. 8 is a pseudocode representation of a second algorithm for implementing a building phase that takes as input the structural colon, left brace, and right brace bitmaps and produces leveled colon bitmaps according to an example embodiment.

FIG. 9 is a pseudocode representation of a third algorithm for generating colon positions of all top-level fields of an object according to an example embodiment.

FIG. 12 is a pseudocode representation of a fourth algorithm for parsing an object with a pattern tree according to an example embodiment.

DETAILED DESCRIPTION

Figure 3:
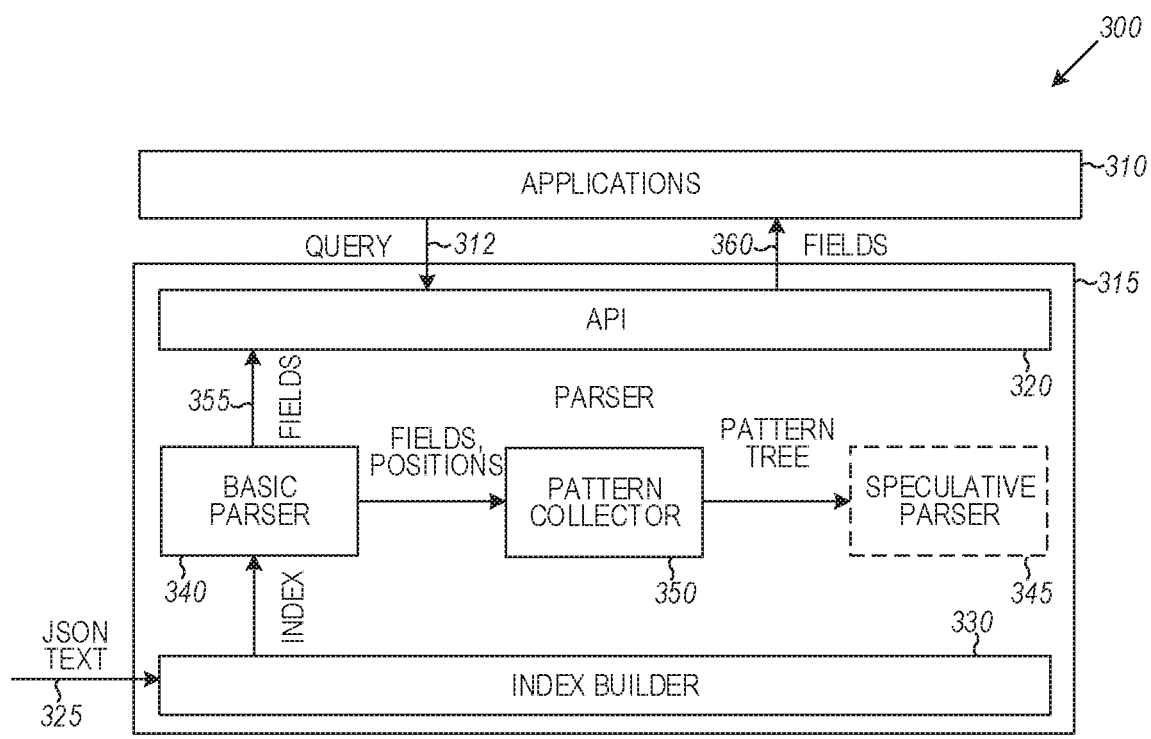
FIG. 3 is a block diagram illustrating an architecture of an example parser, along with data flows in a training phase according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Existing parsers for schema-free data exchange formats, such as Jackson and Gson are mature and have been optimized and tuned for many years. These parsers are based on finite state machines (FSM) which is the textbook approach to build parsers. In contrast, embodiments of the present subject matter include a parser that may be based on speculation and data parallel algorithms.

The parser may utilize a structural index that identifies physical locations of fields in a dataset, such as a data file, data stream, data stored on a storage device, and other data that is expressed in a schema-free data exchange format. The parser may receive a query, and utilize the structural index to find data in fields referenced by the query. The structure of the structural index is described along with methods and algorithms implemented by the parser of creating the structural index, which may utilize data parallel algorithms to efficiently create the structural index. In further embodiments, a subset of the dataset may be used to create patterns that are likely to be encountered, allowing the parser to speculate using multiple different patterns to speculate on the physical location of a desired field.

The parser is motivated by at least three observations made by the inventors. Applications that generate JSON data typically only make use of certain fields. For instance, an application that analyzes Twitter data may only be interested in the timestamps, locations, and authors of a Twitter feed. FSM-based parsers can be lazy, but they need to sequentially traverse all the fields in JSON records and have no way to jump to any field. JSON data has no schema. Nevertheless, there are typically only a limited number of different JSON structural variants in a JSON data stream or JSON collection. Furthermore, there is skew so that most JSON records follow a limited number of structures. To determine the exact position of a JSON field in a JSON record of a specific structure, a parser may look at a few kinds of characters only; e.g., the colon ":" character which delimits fields. Data parallel instructions may be used to find these characters and summarize structural information quickly, optimizing use of hardware processor capabilities.

Based on these observations, the parser may follow a two-step approach. First, the parser builds (using data parallel instructions) or selects a previously-built structural index that was built based on data stream believed to be similar to the data stream being considered, to identify the positions of all fields. The structural index may be created for each JSON file received, or may be selected from a learned structural index from a previous JSON file if that file is likely to have a similar or same structure, such as multiple files received from a same source related to similar data.

In some embodiments, a field index represents a logical position of a field. When a query for a field is received, the logical index for the field is used in conjunction with the structural index to obtain a physical address of the field in the JSON file and allows direct access to the field to respond with the correct queried data.

In further embodiments, the parser may speculate on the schema and directly jump to the position at which it may most likely find the field that the application is asking for. Due to this design, the parser avoids a great deal of wasted work incurred by existing JSON parsers by parsing irrelevant JSON fields. Even if an application is interested in all fields, the parser typically wins by exploiting data parallel instructions (which fundamentally cannot be exploited by FSM-based parsers), yet the performance advantages of the parser may be smaller in such cases.

The resulting parser is beneficial for analytical applications on raw JSON data. Traditionally, running analytical queries efficiently involves parsing and shredding the JSON data first and storing it in a binary format such as Apache Parquet. This approach is still the most efficient approach if all the data is needed for analytics and many analytical queries need to be processed over the JSON data. However, in many instances, a query on raw JSON data may be performed almost as fast as a query by prior parsers directly on the binary format of the JSON data.

FIG. 1 is a block diagram of a system 100 utilizing a parser 110 and structural index 115 to efficiently obtain data from fields in a schema-free data exchange format dataset 120. The dataset 120 may be a data file, streaming data, data stored on a storage device, or other data and may be provided from a service or other source of data. Data from Yelp® is used as an example, representing crowd sourced reviews of restaurants, as described in further detail below with an example showing six records of the data expressed in JSON (JavaScript Object Notation) format. An application 125 may provide an application interface to a user, such as a person or other system desiring to access the data file via a query, such as an SQL query over desired fields of the data. The application may provide a query 130 to the parser requesting data from certain fields of the dataset? 120. The parser 110 may then use the structural index via logical addresses of the desired fields to jump directly to a physical address of the data corresponding to the field and provide the data in the field at 135 to the application.

In further embodiments, the parser 110 may be used directly by a user, skipping the application 125, or using a direct user interface in the application 125. For example, a user can write a program to process a raw JSON file, also referred to as a dataset or data file, and use parser 110 as a JSON parser.

In various embodiments, the overhead of running analytical queries on raw JSON data using the parser is surprisingly low. If only a small fraction of the data is ever analyzed (e.g., 6%) or waiting for cooking data is fundamentally unacceptable (e.g., in real-time analytics), then analyzing JSON data in-situ with the parser becomes a viable and cost-effective option, compared to cooking or processing all data into a binary format useable for computer computations. In contrast, the overhead incurred by running analytical queries on raw JSON data using Jackson, the state-of-the-art JSON parser, is at least one order of magnitude, forcing organizations to cook all data for potential analytics.

Further detail of one example data interchange format that may be parsed by the parser is JSON (JavaScript Object Notation), which is a lightweight, text-based, language-independent data interchange format. The JSON format can be recursively defined as follows (the well-known formal definitions of STRING and NUMBER are omitted):
TEXT=OBJECT . . . OBJECT
OBJECT={STRING:VALUE, . . . , STRING:VALUE}
ARRAY=[VALUE, . . . , VALUE]
VALUE=OBJECT|ARRAY|STRING|NUMBER|true|false|null
STRING="Characters (using backslash escapes)"

A JSON text is a sequence of zero or more JSON objects. An object begins with a left brace ("{") and ends with a right brace ("}"), and contains a sequence of zero or more key/value pairs, separated by commas (","). A key/value pair is called a field of the object. Each key is followed by a single colon (":"), separating the key from its corresponding value. An array is an ordered collection of values, and is represented as brackets ("[" and "]") surrounding zero or more values, separated by commas. A value can be a string in quotes (" ""), a number, true or false, null, an object, or an array. Thus, these structures can be nested. A string is a sequence of zero or more characters, wrapped in quotes. JSON uses backslash as an escape character for "\"", "\\", "\/", "\b", "\f", "\n", "\r", "\t". A number is similar to an integer or decimal number in C or Java. Whitespace can be inserted between any pair of tokens.

The characters used in the dataset may be changed in different datasets. For instance, the colon character used with the key/value pair may be a different character in further embodiments. However, for convenience, the description of examples and algorithms refer to a JSON dataset and use a colon character for convenience. The term "colon" and ":" shall be interpreted as any character with a similar function in various datasets expressed with different grammar than JSON.s. The same convention may also be used for all the other characters used in the JSON grammar, including but not limited to quotes, left bracket, right bracket, escape characters, right and left braces, commas, etc.

The JSON grammar standard ECMA-404 specifies no behavior on duplicate keys. However, the use of JSON in applications is often more restrictive. The standard RFC-7159 defines the JSON Data Interchange Format and declares that "the names within an object SHOULD be unique", in the sense that software implementations often use a hash map to represent a JSON object and therefore have unpredictable behavior when receiving an object with duplicate keys. As per RFC-7159, most existing JSON parsers, e.g. Jackson and Gson, either do not accept duplicate keys or take only one of the duplicated keys. In the following, we assume that all keys are unique within an object.

The term record is used to represent a top-level object in JSON text. In other words, an object is either a record, or a nested object within a record.

FIG. 2 is an illustration of an example dataset 200 consisting of six JSON records, based on a Yelp® dataset. The dataset 200 provides crowd sourced reviews of restaurants and is used as an example dataset throughout the application. Other datasets related to different applications or sources of information may be used in further embodiments. Five of the six records in dataset 200 contain three primitive fields (id, state, city), one array field (categories), and one nested field (attributes) at the root level. Each nested "attributes" object includes up to four boolean fields. Notably, the fourth record in the dataset represents a different kind of entity and thus exhibits a completely different structure.

Parsing text data is potentially an ideal application to exploit data parallelism, as each element of text data, e.g., an 8-bit character in ASCII encoding, is much smaller than a processor word (64-bit ALU word or 128~512-bit SIMD (single instruction multiple data) word.) In this section, we discuss two techniques that exploit data parallelism: SIMD vectorization and bitwise parallelism. One example parsing approach both SIMD vectorization and bitwise parallelism in different parsing steps to achieve the best of both worlds.

SIMD (single instruction multiple data) Vectorization. Modern processors provide SIMD capabilities, the ability to perform the same operation on multiple data items simultaneously. Over the last two decades, mainstream processors have evolved to offer a large variety of SIMD instructions and meanwhile to widen the SIMD registers for higher throughput. Today, 256-bit wide SIMD is considered to be the standard, and latest processors such as Intel® Xeon Phi offer even wider 512-bit SIMD instructions.

Bitwise Parallelism. An alternative vectorization technique is to exploit bitwise parallelism. With this approach, data parallelism is achieved by exploiting the laws of arithmetic rather than specialized hardware. Table 1 lists three bitwise manipulations that provide a fast way to find and manipulate the rightmost 1-bit in a bitmap (the binary representation of an integer value). The notations R, E, and S are used to denote the three manipulations respectively, throughout this paper. Each operator uses only one logical operator (^: logical AND, ⊕: exclusive OR) and one minus operator to implement the manipulation. Although the example value x in Table 1 contains only 8 bits, 64-bit values may be operated upon to achieve 64-way parallelism using today's 64-bit processors. $(XXXXX)_2$ in Table 1 means that XXXXX is in binary representation. Say, $3=(11)_2$, $8=(1000)_2$, $7=(111)_2$ . . . .

Table 1

Bitwise Manipulations and Examples

| Manipulations | Descriptions | Examples |
|---|---|---|
| x | An integer value | $(11101000)_2$ |
| $R(x) = x \wedge (x-1)$ | Remove the rightmost 1 in x | $(11100000)_2$ |
| $E(x) = x \wedge -x$ | Extract the rightmost 1 in x | $(00001000)_2$ |
| $S(x) = x \oplus (x-1)$ | Extract the rightmost 1 in x and smear it to the right | $(00001111)_2$ |

Modern processors also have specialized instructions for some operations that are computationally expensive to be converted to a sequence of bitwise and arithmetic operations. The parsing approach may rely on one of these instructions, called popcnt. popcnt computes the digit sum of all bits of a value; i.e., the parser counts the number of 1s in the value. Given the example value x in Table 1, popcnt $(x)=4$.

In one embodiment, the parser may be used to push down both projections and filters into the parser, saving time by further reducing the amount of data that is considered while parsing a file. Such projections and filters may be used by the parser to avoid parsing portions of the dataset that contain data that is excluded by such projections and filters. In other words, a query may contain a filter that excludes one or more fields.

A key challenge for achieving these features is to jump directly to the correct position of a required field without having to perform expensive tokenizing steps to find the field. A straightforward idea is to predict the position of a required field based on previously seen patterns in the dataset. However, this line of thinking is inherently impracticable because a single variable size field could dramatically impact the locations of all other fields, making the field positions generally unpredictable.

In contrast, the parser may use a two-level approach to quickly locate required fields. At an upper level, the parser may speculatively predict logical locations of required fields based on previously seen patterns in the dataset. Unlike physical positions in JSON text, these logical locations are independent of the sizes of other fields. The parser may then obtain or build structural indices on JSON text, to map logical locations to physical locations. Building a structure index may be done on the fly during parsing.

The parser may select a small portion of the input JSON records as a training set to learn common patterns in the dataset. The training set may range from one to ten percent of the records in some embodiments, and may vary to provide a desired accuracy of the patterns. Less than one percent may be used for very large datasets if desired, and more than ten percent may be used for some datasets. As described below, if use of the patterns does not result in the field being found, basic parsing methods may be used to find the field, decreasing efficiency. A larger data set may decrease the number of fields not being found using speculative parsing via the training set.

Figure 4:
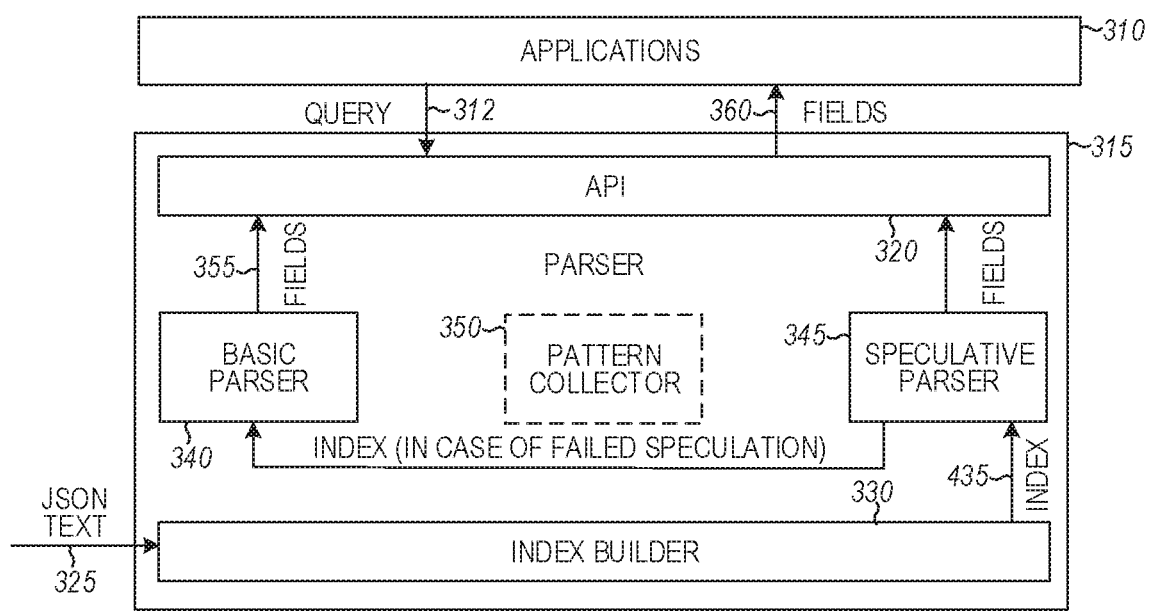
FIG. 4 is a block diagram illustrating the architecture of example parser, along with data flows in a speculative parsing phase according to an example embodiment.

FIG. 3 and FIG. 4 illustrate the architecture of an example parser, along with data flows in the training, at 300, and speculative, at 400, parsing phases. An application 310 can issue a query 312 to a parser 315 through its API 320. The query includes the fields that are needed for the application 310 and might contain other hints such as the structural information of required fields to further enhance the parsing speed.

JSON data 325 from external sources are loaded into the index builder 330, which builds a structural index for each record on the fly. The structural index of a record maps the logical position of any field in the record to its physical location in the text array. In the training phase, the index is provided at 335 to a basic parser 340. In the speculative parsing phase, the index is provided at 435 to a speculative parser 345. After the record is fully parsed, the index may be destroyed from main memory immediately, but remains in CPU caches. As a result, through its life cycle, the index always resides in the CPU caches, and is almost never read from or written to main memory.

During the training phase in FIG. 3, the basic parser 340 uses the index to parse the record without exploiting previously seen patterns. In this phase, the parser 315 parses and extracts all fields, builds statistics (pattern collector 350), and returns the fields 355, 360 that the application 310 asked for. The pattern collector 350 creates a summary representation of all patterns observed in the training phase, which is called a pattern tree.

During the speculative parsing phase in FIG. 4, the structural index is used by the speculative parser, which predicts the logical positions of required fields based on the pattern tree, and probes the structural index to find the physical locations of these fields. Each speculation is verified by comparing the field name at the predicted physical position to the required field name. In the event of a match, the speculative parsing is successful and the parsed fields are returned to the application. Otherwise, the speculative parser ventures another speculation based on another (less frequent) pattern of the pattern tree. If all speculations fail (unobserved pattern from the training phase), the parser 315 invokes the basic parser as a fallback option.

The API 320 may be tailored to the design goals of the parser. Unlike the APIs of existing parsers that essentially iterate over all BON syntax tokens (e.g. RecordBegin. FieldName, etc.), the API of the parser iterates over only the required fields, intentionally ignoring irrelevant fields and other syntax tokens. To create a parser instance, the user may specify a list of fields that are required to be parsed, called a query. In data analytics systems, the required fields can often be inferred from the analytical queries; e.g., the fields used in SELECT, WHERE, GROUP BY, and ORDER BY clauses of SQL queries. Each field in the field list is specified by a path expression using the dot notation. A one-dimensional array field is indicated by a pair of brackets following the field name in the path expression. The parser also allows arbitrary nesting of arrays and objects in path expressions. For instance, the expression "x[ ].y[ ][ ]" represents an array of objects (x) that contain a two-dimensional array (y). Once the parser is created, field IDs are assigned to the specified fields, according to the order of these fields in the list. For instance, given an example query ("reviews", "city", "attributes.breakfast", "categories[ ]") for the running example, the field IDs of the four fields "reviews", "city", "attributes.breakfast", and "categories" are 0, 1, 2, 3, respectively, which correspond to the logical addresses of the fields. The example query is referenced below.

The actual parsing may be driven by two iteration methods. In a first method, NextRecord( ), skips the remaining of the current record and moves a cursor of the parser to the beginning of the next record. The second method, NextField( ), returns the field ID of the next encountered field of interest in the current record until there are no more required fields. For an array field, each element in the array is returned individually, similar to a primitive field. Taking the first record 210 of FIG. 2 and the example query, the parser returns a sequence of field IDs as follows: 0 (reviews), 2 (attribute.breakfast), 3 (categories), 3 (categories), 1 (city), EndOfRecord. Two "categories" fields are returned because the "categories" array has two elements.

As mentioned above, the parser may be used to push down both projections and filters into the parser, saving time by further reducing the amount of data that is considered while parsing a dataset. In addition to the ability to push down a projection operator into the parser. Another related and feature that the parser enables is to push down another common operator, filter operator, into the parser as well. As one might already observed that, for the example query, we can parse only the two fields in the filter predicates, and delay the parsing on the other two fields until the record passes all filter predicates, to further reduce the parsing overhead on unnecessary fields. To enable this feature, the parser allows users to partition the field list into multiple field groups, and parses field groups in a one-after-the-other fashion. For example, given the example dataset 200 shown in FIG. 2, if the query is specified in two groups: {{attributes.breakfast, categories}, {reviews, city}}, the parser first returns the IDs of all fields in the first field group, resulting in the sequence of 0 (attributes.breakfast), 1 (categories), 1 (categories), EndOfGroup. On receiving the EndOfGroup message, users can skip the remaining fields in the second group if the record does not pass all filter predicates. Thus, filtering in the parser can result in faster parsing.

The structural index may be used to quickly locate a set of required fields in a JSON text. The structural index maps the logical position of a field (e.g., second sub-field of the third field) to its physical position (e.g., 156th character) in the JSON text. Conceptually, the parser structural index is similar to metadata information embedded in some binary formats such as Parquet, but it is built on-the-fly as a side-effect of parsing.

Building such a structural index for a record can be done one order of magnitude faster than fully parsing the record. First, building a structural index relies on a linear operation may merely look for structural characters (e.g., ":", "{", and "}") with no branching. In contrast, fully parsing JSON data involves complex switch statements and inherently unpredictable branches. Second, the simplified tokenization process of building a structural index can be implemented by arithmetic and logical operators on a vector of characters by exploiting data parallelism available on modern CPUs. In summary, this indexing approach converts control flow into data flow, largely eliminating unpredictable branches and reducing CPU cycles burnt on each byte.

In one example, the query does not contain any array fields. A further example will be described where the query does contain array fields. The current example also assumes that the input JSON data is in the ASCII encoding. However, it is straightforward to extend the techniques to support other encodings such as UTF-8 and Unicode.

A field index may be used to represent the logical position of a field. The field index of a field in an object is k, if the field is the k-th top-level field of the object. For example, the field index of "categories" in the first record 210 of FIG. 2 is 4, whereas "attributes.dinner" has a field index of 3 in the object "attributes" nested in the first record. Note that the other records 215, 220, 220, 225, 230, and 235 may have different fields, but share many of the same fields in a similar order.

A structural index maps logical to physical locations of fields in a JSON object. Formally, a structural index of an object takes as input the field index of a field in this object, and outputs the physical location of this field in the JSON text.

The physical location of a field can be represented by the position of the colon character that is placed between the key and the value of the field. The advantages of using the colon character to locate a field are threefold. First, there is a one-to-one mapping between colon characters and fields in a JSON text. Second, searching colon characters in a JSON text can be implemented in a fast way using parallel processing capabilities of current and future processors. Third, the field name and value are placed immediately before and after the colon character. Thus, it is efficient to access both the key and the value, starting from the position of the colon character.

Concretely, a structural index is a list of bitmap indices, called leveled colon bitmaps, each of which uses one bit per character to indicate if the corresponding character is a colon character of a field at a particular level. The colon bitmaps are designed to be on a per-level basis to make objects nested in a record independent of each other. Thus, even a highly dynamic nested object in a record has no impact on the field indices of other fields in the record. The number of leveled colon bitmaps that are needed to be constructed depends on the required fields. If the deepest required field is at the l-th level, colon bitmaps are built only up to the l-th level.

FIG. 5 illustrates generally at 500 leveled colon bitmaps built for the first record 210 of FIG. 2 and the example query. As the deepest field ("attributes.breakfast") is at the 2nd level, colon bitmaps are built for the top two levels only. For ease of illustration, a processor with 32-bit processor words is used. Within each word of bitmaps, the 32 bits are organized in little-endian order; i.e., the order of bits is reversed within a word. In FIG. 5, the JSON text is mirrored as indicated to make it more readable in the reversed order. The Level 1 bitmap indicates all colons that correspond to top-level fields in the record. Note that there is also a colon character inside the string value of the field "id". However, its corresponding bit is turned off in the bitmap, as it does not represent any structural information. The Level 2 bitmap sets bits corresponding to the colons within the nested object "attributes".

Structural Indexes are built based on the three structural characters that define the structure of a JSON record: colon ":" (key/value separator), left brace "{" (object begin), and right brace "}" (object end). In addition, it is detected when these characters are used within JSON strings and do not define structure. Thus, the parser also tracks structural characters of JSON strings: quote " "" (string begin/end), and backslash "\" (escape character).

The basic idea is to track these structural characters in the JSON text and build bitmap indices on the positions of these characters. These bitmaps are then transformed to leveled colon bitmaps using the bitwise parallelism. The colon bitmaps identify the locations of key/value pairs in the dataset as well as the physical location of such key/value pairs, as each bit in the bitmap corresponds to one character. Thus, the position of the bit corresponding to a field, also corresponds to the physical location of the field. The values of the key/value pairs, or field, correspond to the data that may be obtained to satisfy a query.

Creating the bitmaps, and hence the structural index, may be done in four steps in one embodiment. The first step builds bitmap indices on structural characters. As the size of each character is 8 bits, the first step may be implemented using SIMD vectorization. For each structural character, the index builder uses the SIMD comparison instruction to compare a vector of n characters (e.g. n=32 for 256-bit SIMD) to a vector that contains n copies of the structural character. The result is a vector in which each 8-bit lane contains either all 1's or all 0's. The index builder then uses an additional SIMD instruction to convert the result vector to a bitmap by selecting the most significant bit of each lane. FIG. 6 at 600 illustrates building structural bitmaps for word 0 of FIG. 5 at step 1, 610.

The first step is the only step in one embodiment that uses SIMD vectorization. Once the initial bitmaps are created, SIMD is not used to manipulate these bitmaps, because a naïve SIMD implementation requires each bit to be padded to the smallest lane size (8-bit), leading to an underutilization of SIMD parallelism. Instead, bitwise parallelism may be utilized in the next three steps 620, 630, and 640.

Given the quote and backslash bitmaps, the second step illustrated at 620 generates a structural quote bitmap to represent the begin and end positions of all strings, thereby excluding escaped quotes within JSON strings. As per the specification of JSON format, a structural quote in JSON text is a quote character following zero or an even number of consecutive backslash characters. For example, the first and last quotes in the record "{"x\"y\\":10}" are structural quotes, while the one in the middle is an escaped quote inside a string.

A quote bitmap is converted to a structural quote bitmap by turning off bits corresponding to non-structural quotes in the quote bitmap. To implement this conversion in a bit-parallel fashion, two-character subsequences "\"" are found by performing a logical AND between the backslash bitmap and the one-bit-right-shifted quote bitmap. For each 1 in the result bitmap, the length of the consecutive 1s in the backslash bitmap is computed starting at the position of this 1, by using the popcnt instruction and bitmap manipulations shown in Table 1. FIG. 6 (Step 2 620) shows the structural quote bitmap built on the example word.

This implementation runs in $$O\left(\frac{n}{w} + p\right)$$

instructions, where n is the number of characters in the JSON text, w is the number of bits in a processor word, and p is the number of the subsequences "\"" in the input text.

The next step 3 at 630 is to transform the structural quote bitmap to a string mask bitmap, in which a bit is on if the corresponding character is inside of a JSON string, and is off if the corresponding character is outside of any JSON strings (bits at the boundaries of strings can be either 0 or 1).

The following example illustrates this conversion on the example word shown in FIG. 6. Initially, the string mask bitmap is set to all 0s. In the first iteration, a mask m is computed to turn on all bits at the right of the first quote by extracting the rightmost 1 and smearing it to the right in the quote bitmap word. This manipulation is implemented in a bit-parallel way, by using the bitwise operator S( ) shown in Table 1. The string mask $m_{string}$ is set to m in this iteration. Then, the rightmost 1 from the word is removed by applying R( ). After that, the original second-rightmost 1 (quote) becomes the rightmost 1 (quote) in the next iteration. In the second iteration, m is computed by turning on all bits at the right of the second quote. This mask is then XORed with $m_{string}$, to extend $m_{string}$ by turning on all bits between the first and second quotes, and turning off all bits at the right of first quote. Thus, $m_{string}$ is now the mask on the first string. The process is continued to incrementally extend $m_{string}$ to the remaining quotes. After the first four iterations (two pairs of quotes), a string mask has been generated that includes the first two strings "id" and "id:\"a\"". The remaining iterations continue in a similar manner. FIG. 6, step 3 at 630 shows the produced string mask on the example word.

As can be observed from this example, if an odd number of iterations are executed, all bits in $m_{string}$ are flipped to be used as a string mask. This trick remains useful even when a string is across word boundaries, as quotes were counted not only in the current word but also in all words that have been processed.

FIG. 7A is a pseudocode representation of a first algorithm 700 for building a string mask, ($b_{quote}$). An input, ($b_{quote}$) comprises a quote bitmap to be filled in by the algorithm 700. An output comprises ($b_{string}$), the string bitmap, which is returned at line 13 of algorithm 700. A set of string bitmaps for multiple iterations of first algorithm 700 is shown at 720 in FIG. 7B.

In an outer loop 710 of first algorithm 700, iteration over all the words in the structural quote bitmap is performed. For each word, an inner loop 715 (lines 5-9) is used to iterate over all 1s in the word. In each iteration, the rightmost 1 in the quote mask is manipulated to extend the string mask to the position of the 1, and then the rightmost 1 is removed from the quote mask. By continuing this process until there are no more 1s in the word, we iterate over all 1s from the right to the left. The string mask generated in the inner loop needs to be flipped if an odd number of quotes have been processed. This algorithms runs in $$O\left(\frac{n}{w} + q\right)$$

instructions, where q denotes the number of structural quotes in the JSON text.

In the last step, step 4 at 640, the string mask bitmap is applied to the colon/left brace/right brace bitmaps to filter out characters within JSON strings. The produced bitmaps are called structural colon/left brace/right brace bitmaps, respectively.

FIG. 8 is a pseudocode representation of a second algorithm 800 for implementing step 4 of a building phase that takes as input the structural colon, left brace, right brace bitmaps and produces leveled colon bitmaps. The basic idea is straightforward: for each right brace, all prior left braces are pushed to a stack, and the top one is popped out as the matching left brace for the current right brace; given the pair of matching left/right braces, the colons are written between them to a corresponding leveled colon bitmap. An input to algorithm 700 comprises Index, the structural index, start, end: the start and end positions of the targeted object level: the level of the targeted object. The output comprises c, a list of positions of the colons. c is returned at line 9 of second algorithm 800.

Second algorithm 800 implements this idea in a bit-parallel fashion. In an outer loop 810, all words are iterated over in the three bitmaps simultaneously. In an inner loop 815, (lines 5-24), second algorithm 800 iterates over each 1 in the current word in the right brace bitmap, i.e. $m_{right}$. Similar to the algorithm 700 used in step 3, this is done by repeatedly removing the rightmost 1 (Line 24) until there is no more 1s in $m_{right}$. For each 1 in $m_{right}$, all prior 1s are found in the current word of the left brace bitmap, i.e. $m_{left}$, and their positions are pushed into the stack S (Line 8-11). To do that, the rightmost 1 in $m_{left}$ (Line 10) is repeatedly removed until the mask of the extracted rightmost bit ($m_{rightbit}$) of $m_{left}$ is arithmetically greater than that of $m_{right}$ (Line 8), meaning that the left brace is beyond the right brace. In Line 12, the top left brace from the stack is popped out as the matching left brace of the current right brace, and then the region between the pair of matching left/right braces in leveled colon bitmaps is updated. This process can also be done efficiently with bitwise manipulations. For example, if the left and right braces are in the same word, a mask on the characters between them may be generated by performing $\overline{m_{rightbit} - m_{leftbit}}$ (Line 15). For instance, if $m_{rightbit} = (01000000)_2$ and $m_{leftbit} = (00000100)_2$, then $\overline{m_{rightbit} - m_{leftbit}} = (00111000)_2$. This algorithm runs in $$O\left(\frac{n}{w} + b\right)$$

instructions, where b denotes the total number of left and right braces. FIG. 6, Step 4, 640 shows the produced Level 1 and Level 2 colon bitmaps on the example word.

In one example embodiment, a basic parsing method uses a structural index to locate required fields, without exploiting any common patterns in the dataset.

FIG. 9 is a pseudocode representation of a third algorithm 900 for generating colon positions of all top-level fields of an object. The start/end positions as well as the level of the object are passed as arguments to the method. The algorithm iterates over all words that overlap with the [start.end] range, in the corresponding leveled colon bitmap. For each word, we repeatedly extract and remove the rightmost 1 until there is no more 1s in the word (in Lines 3-8), iterating over each quote in the JSON text. The offset of each 1 in the bitmap, i.e. the position of the corresponding colon, is computed based on its word id and its offset inside the word (in Line 4). To compute the offset inside the word, we count the number of bits at the right of the 1 (in Line 4), using the popcnt instruction.

To parse a whole record, third algorithm 900 is first invoked to obtain the positions of top-level colons in the record. For each colon found, the JSON text is scanned backwards from the colon position to retrieve the field name, which is then searched against a hash table containing all required field names. If the field name is included in the hash table, the field value is returned in case of an atomic field, or recursively call third algorithm 900 to find the colon positions of the nested object at the next level in case of an object field. In the latter case, the positions of the current colon and the immediately next colon are used as the start and end positions passed into the method, respectively.

Figure 10:
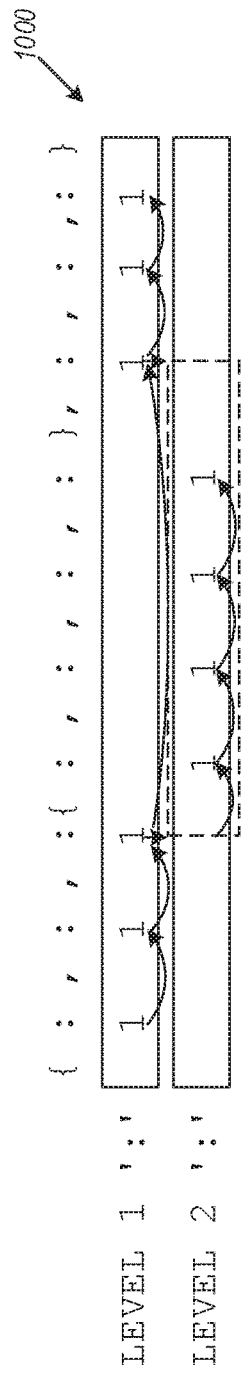
FIG. 10 illustrates the parsing process with the example structural index according to an example embodiment.

FIG. 10 illustrates the parsing process with the example structural index. Only some structural characters in the JSON text are shown due to lack of space. The parsing starts from Level 1, and scans over all 1s in the bitmap using Algorithm 900. For the nested object field (e.g. "attributes"), the 1s are used before and after the nested object in Level 1 to define a range, and iterate over all 1s in Level 2 within this range to find all required fields within the nested object (e.g. "attributes.breakfast"). As can be observed from this figure, objects within a record are completely independent of each other during the parsing process, due to the leveled nature of the index.

To support array fields, the parser may be extended by: 1) building three more bitmap indices on left brackets, right brackets, and commas, in Step 1 of the building phase; 2) building leveled comma bitmaps for repetition levels in Step 4 of the building phase, similar to building leveled colon bitmaps for nesting levels; and 3) using the leveled comma bitmaps to locate array elements during parsing. The extension may be used if the query (rather than the JSON record) contains array fields. If not, the previous technique can be used directly, even if the dataset includes array fields.

In one embodiment where at least one queried field is an an array, leveled COMMA bit maps may be included in the structured index. The leveled comma bit map may be generated in the same manner as a leveled colon bit map, simply by searching for commas instead of colons. The leveled comma bitmaps may be used to identify where each element of an array begins and ends. The structure and build algorithm of comma bit maps are similar to those of colon bit maps.

A speculative parsing technique exploits common patterns in a JSON data collection (or a JSON data stream) in order to enhance the parsing speed. Although the basic parsing method previously described outperforms conventional FSM-based solutions, it still retrieves and verifies all field names in a record, which may limit performance. Speculation allows for prediction of the logical locations of required fields based on previously seen patterns, and only retrieve fields at the speculated or predicted locations, which then need to be verified. On a misprediction, the basic parsing method may be used.

JSON records usually follow an overall structure or template that does not vary significantly across records. A speculation mechanism focuses on an aspect of this structure or template: the fields and their field indices in each object. The advantages of this focus are threefold. First, given the field index of a field in an object, we can directly jump to the location of the field in the JSON text, by using the structural index. Second, a speculation on the field index of a field can be effectively verified by retrieving and examining the field name in the JSON text. Third, field indices of top-level fields of an object are independent of the sizes of these fields and the hierarchical structure of nested fields.

In order to gain a better understanding on how the structure of each JSON object varies, a workload analysis conducted on a set of representative real-world JSON datasets, resulted in three types of structural variance, namely:

Extra or missing fields: Objects in a dataset have extra fields or missing fields. This often happens when the dataset is generated by different versions of the same program.

Out-of-order fields: Fields in objects are arranged in different orders. This type of variance often occurs within highly dynamic objects that are (deeply) nested in records.

Mixed entities: Records in a dataset logically represent different kinds of entities, and exhibit completely different structures. This type of variance is largely due to the combination of multiple datasets representing different entities.

In practice, a real-world dynamic JSON dataset often contains one or a mix of multiple types of structural variance. An effective speculation mechanism should be able to accommodate all these types of structural variance.

In one embodiment, a pattern tree may be generated for use by the speculation mechanism. Users may specify a list of fields that are needed to be parsed. These fields are called atomic fields, as these fields contain an atomic value from the view of the parser. The "atomic" value could actually be a JSON object if users specify to parse a field as a generic value or a raw string. In this case, one can think of the object as an atomic string value. Accordingly, a field is called an object field if it is an ancestor of an atomic field, i.e. its path is a prefix of an atomic field's path. Both atomic and object fields are collectively called required fields.

Each occurrence of an object field in a JSON text introduces a pattern of the object field, which is defined as a sequence of top-level required fields within the object, along with their field indices.

For example, given the running example, consider the following query: {"reviews", "city", "attributes.breakfast", "attributes.lunch", "attributes.dinner", "attributes.latenight", "categories"}. All these seven fields are atomic fields. In addition, we have two object fields: the field "attributes" and a field representing the whole record, called the root field. The first record of the dataset introduces a pattern of the root field: {reviews (2), attributes (3), categories (4), city (6)}. The numbers in parenthesis are the field indices of the corresponding fields. Note that the fields that are not requested by the user are excluded from the pattern, and thus the field indices in the sequence are not consecutive integers. Additionally, the record also introduces a pattern of the nested "attributes" object field: {attributes.breakfast (1), attributes.lunch (2), attributes.dinner (3), attributes.latenight (4)}.

To bring the speculation mechanism into a JSON parser, the pattern tree is a data structure that may be used to cope with all the three types of structural variance. A pattern tree is constructed for each object field, and summarizes the common patterns of the object field in a (large) collection of JSON records.

A pattern tree of an object field f is a multi-way tree structure of height h, where h is the number of required child (atomic/object) fields of f. Each root-to-leaf path in the tree corresponds to a unique pattern of f. The path starts from a sentinel root node, followed by nodes corresponding to each required field in the pattern, ordered by their field indices. Each node in the tree contains three attributes: field, field index, and weight. The weight attribute indicates how many objects exhibit the same pattern for f. If two patterns share a common prefix where both fields and their field indices in the two patterns are exactly the same, we combine the matching nodes in the two paths and add the weights of these matching nodes together. In the tree structure, all child nodes of each internal node are sorted in descending order of their weights.

If any required field is missing from a pattern, the corresponding path in the pattern tree is extended to include the missing fields, making the path have the same length as other paths. The field indices of the newly added nodes are set to be zero to indicate that those fields do not present in this pattern. These nodes are always placed before all ordinary nodes along each path.

Figure 11:
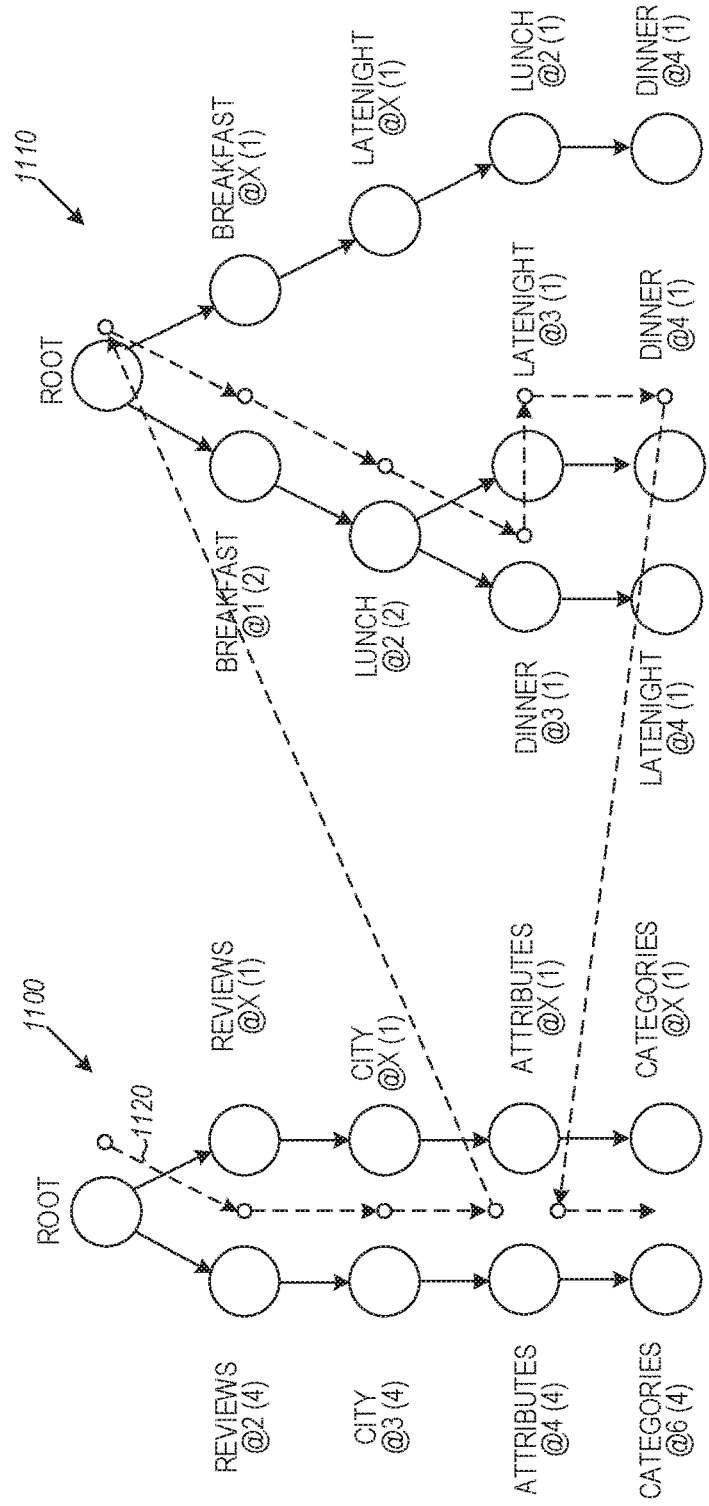
FIG. 11 illustrates two pattern trees and built on the running example dataset, for a query according to an example embodiment.

FIG. 11 illustrates the two pattern trees 1100 and 1110 built on the running example dataset, for the query {"reviews", "city", "attributes.breakfast", "attributes.lunch", "attributes.dinner", "attributes.latenight", "categories"} (ignore the dashed path for now). The pattern trees 1100 and 1110 are constructed based on the first five records in the dataset. Each node in the figure is labeled in the form of "FieldName@FieldIndex (weight)". The pattern tree 1100 of the root field has two root-to-leaf paths. The left path corresponds to the four records that share a same pattern at the root level, whereas the right path corresponds to a record (the fourth record) representing a different type of entity and thus does not contain any required fields. Pattern tree 1100 illustrates an example of how to accommodate the "mixed entities" type of structural variance. Pattern tree 1110 corresponds to an "attributes" object field. The tree 1110 has three root-to-leaf paths, corresponding to three unique patterns detected from the four records. The leftmost path represents the most common pattern. The path in the middle corresponds to a pattern that has a pair of out-of-order fields, compared to the most common pattern. The corresponding pattern of the rightmost path includes only two fields. In spite of this, the other two missing required fields are still included in the path but their field indices are marked as "X" to indicate their absence in the pattern. The middle and rightmost paths represent examples of out-of-order fields and missing fields, respectively.

As real-world datasets turn to exhibit strong similarity in the structure of objects, the size of a pattern tree is often very small in practice. However, in the worst case, the size of a pattern tree might become unmanageable, if the object field is highly dynamic in a dataset. In one embodiment, a threshold may be used to control the size of a pattern tree: if the weight of a pattern is less than a certain threshold, the pattern is very unlikely to be used in the parsing phase, and thus may be removed from the pattern tree. For example, if a pattern is likely to be used in one percent or less during a parsing phase, the pattern may be deleted. The threshold may range from less than 1% to 10%. The threshold may also be varied between datasets to provide a desired performance level and may be further modified based on monitoring actual parser performance on a dataset.

In one embodiment, a small subset of records in the data collection may be used as a training set to "train" pattern trees. During the training phase, records are parsed with the basic parsing method. Along with parsing, patterns of all object fields are also generated, and are collected to incrementally build pattern trees. Given a pattern, the training involves traversing the corresponding pattern tree from the root to a leaf according to the fields and field indices in the pattern, updating the weights of matching nodes along the path and creating new nodes if necessary. When the training phase is completed, the threshold discussed above is applied to finalize all pattern trees by removing patterns or paths unlikely to be used.

As pattern trees capture all common patterns frequently appearing in the training set, the speculative parsing algorithm attempts to parse new objects following one of these patterns, starting from the most common pattern to less common patterns. If none of the patterns in the tree matches the object to have parsed, the speculative parsing is considered to have failed. In this case, the parser falls back on the basic parsing method.

FIG. 12 is a pseudocode representation of a fourth algorithm 1200 for parsing an object with a pattern tree. The input is a pattern tree of an object. Output is true if success and false if failed. The fourth algorithm 1200 traverses the pattern tree starting from the root node—line 1. At lines 3-4 if a node is a leaf node, true is returned. On each atomic field node accessed as indicated in line 8, the Verify( ) method is invoked at line 9 to examine if the speculated position is correct. This method first converts the speculated field index to the physical location of the field, using the structural index, and then retrieves the field name in the JSON text at the speculated position. The speculation is then verified by comparing the retrieved field name to a desired field name in the node at line 9. For an absent node, a Bloom filter built on all field names is looked up to quickly verify absence of the node. Basically, a bloom filter is a space-efficient probabilistic data structure that is used to test whether an element is not a member of a set or may be a member of the set. If the verification is passed, the algorithm moves down to the next level. Otherwise, its next sibling node is moved to. If a node represents an object field, the algorithm recursively drills down to the pattern tree of the nested field. To parse a whole record, the ParseObject( ) method is invoked on the pattern tree of the root field.

FIG. 11 also shows a traversal path 1120 for parsing the sixth record in the running example, using the pattern trees constructed on the first five records. In this path traversal, start from the root node of the root field, and choose the leftmost branch at each level until reaching the node "attributes@4", which is an object field and contains its own pattern tree. After jumping to the pattern tree on the right side and continuing to pick the leftmost child, the node "dinner@3" is reached. By examining the field name, the parser realizes that the 3rd field of the "attributes" object is not "dinner". In this case, shifting to its sibling node and finding that the next field is actually a "latenight" field at index 3. Continuing with this traversal down the tree and successfully completing the parsing. This example demonstrates how the parser copes with out-of-order fields. In this path traversal, 9 nodes are accessed and verified in total, with a hit rate of 8/9≈88.9%.

Figure 13:
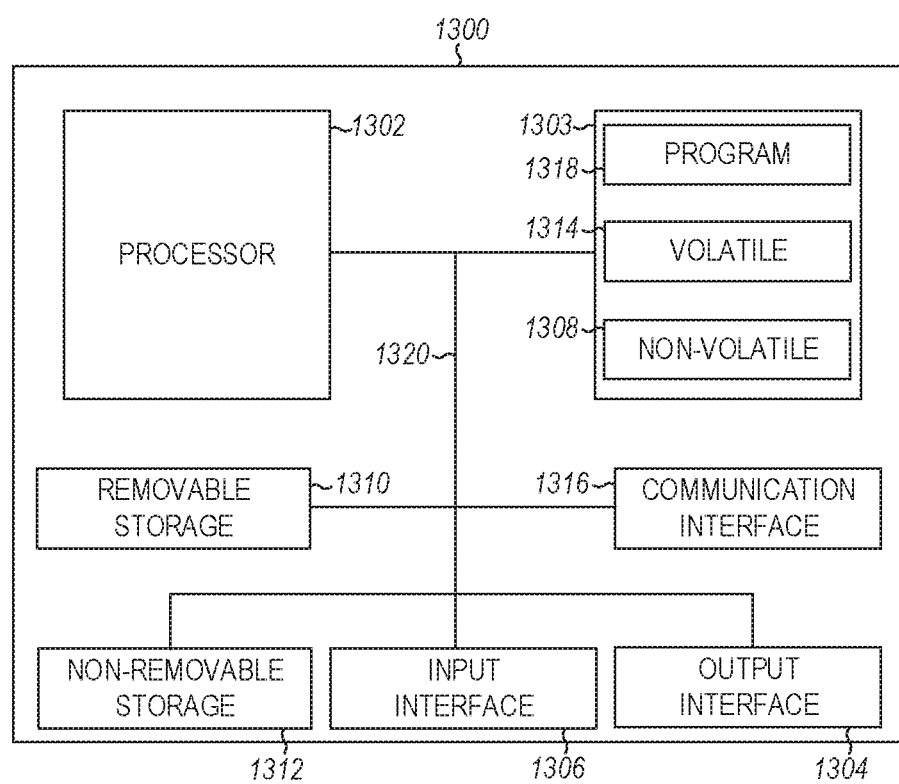
FIG. 13 is a block diagram of circuitry for example devices to perform methods and algorithms according to example embodiments.

FIG. 13 is a block schematic diagram of a computer system 1300 to implement devices that provide JSON data, parse JSON data and utilize fields obtained from JSON data as well as other devices for performing methods and algorithms according to example embodiments. All components need not be used in various embodiments.

One example computing device in the form of a computer 1300 may include a processing unit 1302, memory 1303, removable storage 1310, and non-removable storage 1312. Although the example computing device is illustrated and described as computer 1300, the computing device may be in different forms in different embodiments. For example, the computing device may instead be a smartphone, a tablet, smartwatch, smart storage device (SSD), or other computing device including the same or similar elements as illustrated and described with regard to FIG. 13. Devices, such as smartphones, tablets, and smartwatches, are generally collectively referred to as mobile devices or user equipment. Further, although the various data storage elements are illustrated as part of the computer 1300, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 1303 may include volatile memory 1314 and non-volatile memory 1308. Computer 1300 may include— or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1300 may include or have access to a computing environment that includes input interface 1306, output interface 1304, and a communication interface 1316. Output interface 1304 may include a display device, such as a touchscreen, that also may serve as an input device. The input interface 1306 may include one or more of a touchscreen, touchpad, mouse, keyboard, camera, one or more device-specific buttons, one or more sensors integrated within or coupled via wired or wireless data connections to the computer 1300, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1300 are connected with a system bus 1320.

Computer-readable instructions stored on a computer-readable medium are executable by the processing unit 1302 of the computer 1300, such as a program 1318. The program 1318 in some embodiments comprises software that, when executed by the processing unit 1302, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1318 may be used to cause processing unit 1302 to perform one or more methods or algorithms described herein.

EXAMPLES

In example 1, a method includes obtaining a query containing at least one field from which data is being queried, obtaining a dataset having a schema-free data exchange format having multiple fields of data at different physical positions in the dataset, and parsing the dataset by obtaining a structural index that maps logical locations of fields to physical locations of the fields of the dataset, accessing the structural index with logical locations of the fields that index to the physical locations, and providing data from the fields based on the physical locations responsive to the query.

Example 2 includes the method of example 1 wherein the physical location of a field is represented by a colon placed between a field key and a value of the field and wherein the schema-free data exchange format is a JSON (Java Script Object Notation) format.

Example 3 includes the method of any of examples 1-2 wherein the query identifies a set of required fields, and wherein the structural index is obtained as a function of the set of required fields.

Example 4 includes the method of example 3 wherein the structural index comprises leveled colon bit maps representing positions of colons in the dataset corresponding to fields of objects in the dataset and separating keys from values in key/value pairs in the fields.

Example 5 includes the method of any of examples 3-4 wherein the structural index comprises a leveled comma bit map responsive to an array being presented and queried in the dataset to represent where each element of an array begins and ends.

Example 6 includes the method of any of examples 1-5 and further comprising obtaining a pattern tree having multiple patterns identifying speculative positions in the dataset a field is located, wherein the pattern tree is derived from a partial set of training data obtained from the dataset, wherein accessing the structural index with logical locations of the fields that index to the physical locations provides a location of the field, and performing a verify operation to determine if the field name is the same as a desired field name.

Example 7 includes the method of example 6 and further comprising: responsive to the field name being the same as the desired field name, returning the value of the field.

Example 8 includes the method of any of examples 6-7 and further comprising: responsive to the field name not being the same as the desired field name, repeating accessing and verifying using a different pattern in the pattern tree.

Example 9 includes the method of example 8 and further comprising repeating the operations of example 7 until: either the desired field and value is provided, or the desired field is not found and the entire data structure is parsed to identify the physical location of the desired field.

Example 10 includes the method of any of examples 1-9 wherein accessing the structural index is performed as a function of projections or filters corresponding to the query.

In example 11, a method of generating a structural index identifying locations of fields in a dataset having a schema-free data exchange format having multiple fields of data at different physical positions in the dataset, the method including detecting key/value structural character separators of data fields in the dataset, detecting object begin and object end characters in the dataset, detecting when the structural characters occur within dataset strings and do not define a structure of the dataset, and creating a bitmap corresponding to structural character separators of the data fields that define the structure of the dataset, wherein the bitmap identifies physical locations of such data fields from logical locations of such data fields.

Example 12 includes the method of example 11 wherein detecting key/value structural character separators of data fields in the dataset comprises building a structural bitmap for each of multiple characters comprising key/value separator characters, object begin and object end characters, string begin and string end characters, element separator in an array, array begin and end characters, and escape characters.

Example 13 includes the method of example 12 wherein the characters comprise JSON (Java Script Object Notation) characters of colons for key/value separator characters, left brace for object begin, right brace for object end, quotes for string begin and string end, comma for element separator in an array, left bracket for array begin, right bracket for array end, and backslash for escape characters.

Example 14 includes the method of any of examples 12-13 wherein detecting key/value structural character separators is performed by using SIMD (single instruction multiple data) vectorization to first compare a vector of n characters to a vector that contains n copies of the structural character to obtain a multiple bit per lane vector that contains all 1's or all 0's and to second, convert the result vector to a bitmap by selecting the most significant bit of each lane.

Example 15 includes the method of any of examples 12-14 wherein detecting object begin and object end structural characters in the data structure comprises generating a structural quote bitmap to represent the begin and end positions of all strings, thereby excluding escaped quotes within JSON strings.

Example 16 includes the method of example 15 wherein detecting when the structure characters occur within dataset strings and do not define data structures comprises converting the quote bitmap to a structural quote bitmap by turning off bits corresponding to non-structural quotes in the quote bitmap.

Example 17 includes the method of example 16 wherein converting the quote bitmap to a structural quote bitmap is performed in a bit-parallel fashion wherein two-character subsequences "\'" are found by performing a logical AND between a backslash bitmap and a one-bit-right-shifted quote bitmap where for each 1 in a result bitmap, a length of consecutive 1s in the backslash bitmap is computed starting at the position of a current 1.

Example 18 includes the method of example 17 wherein creating a bitmap corresponding to structural character separators of the data fields that define dataset structure results in the bitmap identifying physical locations of such data fields from logical locations of such data fields, and further comprising transforming the structural quote bitmap to a string mask bitmap, in which bits are on if the corresponding character is inside of a data structure string, and in which bits are off if the corresponding character is outside of any data structure strings, wherein bits at the boundaries of strings are either 0 or 1.

Example 19 includes the method of any of examples 11-18 wherein the elements are performed on a training subset of the dataset to create a pattern tree having multiple patterns identifying speculative positions in the dataset identifying the physical location of a field.

In example 20, a machine readable storage device has instructions for execution by a processor of a machine to cause the processor to perform operations to perform a method of generating a structural index identifying locations of fields in a dataset having a schema-free data exchange format having multiple fields of data at different physical positions in the dataset, the method including detecting key/value structural character separators of data fields in the dataset, detecting object begin and object end structural characters in the dataset, detecting when the structure characters occur within dataset strings and do not define a structure of the dataset, and creating a bitmap corresponding to structural character separators of the data fields that define structure of the dataset, wherein the bitmap identifies physical locations of such data fields from logical locations of such data fields.

Example 21 includes the machine readable storage device of example 19 wherein detecting key/value structural character separators of data fields in the data structure comprises building a structural bitmap for each of multiple characters comprising key/value separator characters, object begin and object end characters, string begin and string end characters, array begin and array end characters, comma for element separator in an array, left bracket for array begin, right bracket for array end, and escape characters, and wherein detecting key/value structural character separators is performed by using SIMD (single instruction multiple data) vectorization via the processor to first compare a vector of n characters to a vector that contains n copies of the structural character to obtain a multiple bit per lane vector that contains all 1's or all 0's and to second, convert the result vector to a bitmap by selecting the most significant bit of each lane.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
obtaining a query containing at least one character delimited field from which data is being queried;
obtaining a dataset having a schema-free data exchange format having multiple fields of data at different physical positions in the dataset; and
parsing the dataset by:
obtaining a structural index that maps logical locations of the fields of data to physical locations of the fields of the dataset;
accessing the structural index with logical locations of the fields that index to the physical locations; and
providing data from the fields based on the physical locations responsive to the query wherein the structural index comprises character separated bit maps representing positions of separation characters in the dataset corresponding to fields of objects in the dataset and separating keys from values in key/value pairs in the fields.

2. The method of claim 1 wherein the physical location of a field is represented by a colon placed between a field key and a value of the field and wherein the schema-free data exchange format is a JSON (Java Script Object Notation) format.

3. The method of claim 1 wherein the query identifies a set of required fields, and wherein the structural index is obtained as a function of the set of required fields.

4. The method of claim 3 wherein the separation characters comprises colons.

5. The method of claim 3 wherein the structural index comprises a leveled comma bit map responsive to an array being presented and queried in the dataset to represent where each element of an array begins and ends.

6. The method of claim 1 wherein accessing the structural index is performed as a function of projections or filters corresponding to the query.

7. A method comprising:
obtaining a query containing at least one field from which data is being queried;
obtaining a dataset having a schema-free data exchange format having multiple fields of data at different physical positions in the dataset; and
parsing the dataset by:
obtaining a structural index that maps logical locations of the fields of data to physical locations of the fields of the dataset;
accessing the structural index with logical locations of the fields that index to the physical locations;
providing data from the fields based on the physical locations responsive to the query;
obtaining a pattern tree having multiple patterns identifying speculative positions in the dataset a field is located, wherein the pattern tree is derived from a partial set of training data obtained from the dataset;
wherein accessing the structural index with logical locations of the fields that index to the physical locations provides a location of the field; and
performing a verify operation to determine if a name of the field is the same as a desired field name.

8. The method of claim 7 and further comprising:
responsive to the name of the field being the same as the desired field name, returning the value of the field.

9. The method of claim 7 and further comprising:
responsive to the name of the field not being the same as the desired field name, repeating accessing and verifying using a different pattern in the pattern tree.

10. The method of claim 9 and further comprising repeating the operations of claim 8 until: either the desired field and value is provided, or the desired field is not found and the entire data structure is parsed to identify the physical location of the desired field.

11. A machine readable storage device having instructions for execution by a processor of a machine to cause the processor to perform operations to perform a method, the operations comprising:
obtaining a query containing at least one character delimited field from which data is being queried;
obtaining a dataset having a schema-free data exchange format having multiple fields of data at different physical positions in the dataset; and
parsing the dataset by:
obtaining a structural index that maps logical locations of the fields of data to physical locations of the fields of the dataset wherein the structural index comprises a character bit map representing positions of characters in the dataset corresponding to fields of the dataset;
accessing the structural index with logical locations of the fields that index to the physical locations; and
providing data from the fields based on the physical locations responsive to the query.

12. The device of claim 11 wherein the physical location of a field is represented by a colon placed between a field key and a value of the field and wherein the schema-free data exchange format is a JSON (Java Script Object Notation) format.

13. The device of claim 11 wherein the query identifies a set of required fields, and wherein the structural index is obtained as a function of the set of required fields.

14. The device of claim 13 wherein the structural index comprises leveled colon bit maps representing positions of colons in the dataset corresponding to fields of objects in the dataset and separating keys from values in key/value pairs in the fields.

15. The device of claim 13 wherein the structural index comprises a leveled comma bit map responsive to an array being presented and queried in the dataset to represent where each element of an array begins and ends.

16. The device of claim 11 and further comprising:
obtaining a pattern tree having multiple patterns identifying speculative positions in the dataset a field is located, wherein the pattern tree is derived from a partial set of training data obtained from the dataset;
wherein accessing the structural index with logical locations of the fields that index to the physical locations provides a location of the field; and
performing a verify operation to determine if a name of the field is the same as a desired field name.

17. The device of claim 16 and further comprising: responsive to the name of the field being the same as the desired field name, returning the value of the field.

18. The device of claim 16 and further comprising: responsive to the name of the field not being the same as the desired field name, repeating accessing and verifying using a different pattern in the pattern tree.

19. The device of claim 18 and further comprising repeating the operations of claim 8 until:
either the desired field and value is provided, or the desired field is not found and the entire data structure is parsed to identify the physical location of the desired field.

20. The device of claim 11 wherein accessing the structural index is performed as a function of projections or filters corresponding to the query.

* * * * *